(12) United States Patent
Glasberg et al.

(10) Patent No.: US 10,904,702 B2
(45) Date of Patent: *Jan. 26, 2021

(54) STAND ALONE SOLUTION FOR LOCATION OF A CELLULAR PHONE

(71) Applicant: Verint Systems LTD., Pituach (IL)

(72) Inventors: Roy Glasberg, Nicosia (CY); Ishay Barlev, Limassol (CY)

(73) Assignee: VERINT SYSTEMS LTD., Pituach (IL)

( * ) Notice: Subject to any disclaimer, the term of this patent is extended or adjusted under 35 U.S.C. 154(b) by 167 days.

This patent is subject to a terminal disclaimer.

(21) Appl. No.: 16/044,029

(22) Filed: Jul. 24, 2018

(65) Prior Publication Data

US 2019/0020972 A1 Jan. 17, 2019

Related U.S. Application Data

(63) Continuation of application No. 14/778,806, filed as application No. PCT/IL2014/050310 on Mar. 20, 2014, now Pat. No. 10,034,126.

(Continued)

(51) Int. Cl.
| | |
|---|---|
| *H04W 12/00* | (2009.01) |
| *H04W 4/029* | (2018.01) |
| *H04M 3/22* | (2006.01) |
| *H04L 29/06* | (2006.01) |
| *G06Q 10/08* | (2012.01) |

(Continued)

(52) U.S. Cl.
CPC ............ *H04W 4/029* (2018.02); *G06Q 10/08* (2013.01); *H04L 63/304* (2013.01); *H04M 3/2281* (2013.01); *H04W 4/14* (2013.01); *H04W 12/007* (2019.01); *H04W 12/0013* (2019.01); *H04W 12/1202* (2019.01)

(58) Field of Classification Search
CPC ...................................................... H04W 4/02
See application file for complete search history.

(56) References Cited

U.S. PATENT DOCUMENTS

| | | |
|---|---|---|
| 5,940,756 A | 8/1999 | Sibecas et al. |
| 6,052,597 A | 4/2000 | Elkstrom |
| (Continued) | | |

FOREIGN PATENT DOCUMENTS

| | | |
|---|---|---|
| WO | 2007/010220 | 1/2007 |

OTHER PUBLICATIONS

International Preliminary Report on Patentability and Written Opinion, dated Sep. 22, 2015, received in connection with International Patent Application No. PCT/IL2014/050310.

(Continued)

*Primary Examiner* — Michael T Vu
(74) *Attorney, Agent, or Firm* — Meunier Carlin & Curfman LLC

(57) ABSTRACT

A method for locating of a wireless device, performed by a third party, comprising: communicating with the wireless device in a silent call, to compel the wireless device to continuously emit signals; activating a monitoring apparatus to monitor the signals emitted from the wireless device; resetting an idling timer means of the wireless device, such that the silent call is not ended by the wireless device, identifying a relative location from which the signals become stronger and locating the wireless device; and terminating the silent call.

8 Claims, 3 Drawing Sheets

Related U.S. Application Data

(60) Provisional application No. 61/803,805, filed on Mar. 21, 2013.

(51) Int. Cl.
*H04W 12/12* (2009.01)
*H04W 4/14* (2009.01)

(56) References Cited

U.S. PATENT DOCUMENTS

| | | |
|---|---|---|
| 6,184,801 B1 | 2/2001 | Janky |
| 6,553,236 B1 | 4/2003 | Dunko et al. |
| 8,373,538 B1 | 3/2013 | Hildner et al. |
| 2003/0129980 A1 | 7/2003 | Sayeedi |
| 2006/0293053 A1 | 12/2006 | Zanaty |
| 2008/0309557 A1 | 12/2008 | Mailaender |
| 2011/0171974 A1* | 7/2011 | Kim .............. H04W 60/02 455/456.2 |
| 2011/0210849 A1 | 9/2011 | Howard et al. |
| 2011/0212699 A1 | 9/2011 | Howard et al. |
| 2011/0281592 A1 | 11/2011 | Tamura et al. |

OTHER PUBLICATIONS

International Search Report, dated Jul. 29, 2014, received in connection with International Patent Application No. PCT/IL2014/050310.

* cited by examiner

STAND ALONE SOLUTION FOR LOCATION OF A CELLULAR PHONE

CROSS REFERENCE TO RELATED APPLICATIONS

This application is a continuation of and incorporates entirely by reference U.S. patent application Ser. No. 14/778,806, now U.S. Pat. No. 10,034,126 issued on Jul. 24, 2018, as a national phase filing of PCT Application Serial No. PCT/IL14/50310 filed on Mar. 20, 2014, claiming priority to U.S. Provisional Patent Application Ser. No. 61/803,805 filed on Mar. 21, 2013, the contents of which are also incorporated entirely by reference herein.

FIELD OF THE INVENTION

The invention relates to third party location and identification of wireless devices.

BACKGROUND OF THE INVENTION

Communicating with and locating a wireless device, by a third party, are both known in prior art, but it is non-trivial and not obvious to be able to do both at the same time.

Law enforcement officials may wish to locate a particular wireless device, without alerting the user that his device is under surveillance. In prior art methods of locating a device, communication to and from the device is blocked during the "homing in" time period in which law enforcement is attempting to locate the device. Even if the "homing in" process is covert and the user of the mobile device is not alerted by changes to the wireless display, that the third party process is underway, in all cases, communication is interrupted during this period. A user is unable to make or receive phone calls, messages, etc. and may note a momentary interruption in service. Should this interruption be lengthy, a criminal user may become suspicious and discard the mobile device, foiling the law enforcement attempt to locate the user.

Another example for use of the present invention, is in a search and rescue operation, after for instance an earthquake, where rescuers were able to initially communicate with a person trapped under rubble. Using the proposed method, the trapped person's location can be pin-pointed, aiding in the rescue efforts.

Thus, it would be advantageous to enable continuous, simultaneous covert location of a wireless device without interrupting communication with the device.

SUMMARY OF THE INVENTION

Accordingly it is a principal object of the present invention to enable continuous, simultaneous communication with and location of a wireless device (e.g. mobile phone).

It is another principal object of the present invention to overtly and/or covertly locate a wireless device.

It is one other principal object of the present invention to cause a wireless device to emit RF signals that will enable another device or equipment to locate the origin of the radio signals and thus locate the mobile phone. Non-limiting examples of equipment for locating the wireless device include an RF receiver, and other, more sophisticated related receivers. Such an RF receiver can be tuned in to the RF frequency of the phone and aid in locating it while determining to the holder in which direction the signal becomes stronger and in which directions weaker.

In the present invention, the term "wireless device" includes the following non-limiting examples: a cellular phone, a PDA, a tablet, a laptop, a device having a Global Positioning System receiver, and a wireless tracker tag.

In the method of the invention, a virtual base transceiver station (also termed a BTS or an IMSI catcher), is used to locate a target wireless device, most typically a mobile phone. The virtual BTS will communicate with the mobile phone in a manner that will compel the wireless device to emit radio signals, but will minimize or preclude changing the mobile phone's display and/or functionality. The method enables the choice of either providing full functionality services or suspending some or all services of the mobile network (e.g. data packet handling, incoming call, outgoing call, incoming SMS, outgoing SMS, etc.).

The method of the present invention causes a wireless device to continuously transmit. The purpose is to locate the device. In order to find a first wireless device that is transmitting, the invention uses another device, such as an RF receiver, that is tuned to the transmission frequency of the first device. When one gets closer to the first device the signal becomes stronger. This procedure is called a "silent-call". It is considered silent as it is covert—no notification appears on the mobile device that the radio is active and transmitting.

When silent-call is on, the user of the mobile device may not be able to get incoming calls and may become suspicious or he may be trying to make a call and the mobile device will endlessly try to place the call without success. If the user is fearful of being discovered he may turn off his cell phone, thus severing silent-call.

In contrast, the "Hyper-call" mode of the invention is an enhancement of silent-call. Hyper-call allows the user to make phone calls even when silent call occurs in the background. Thus, one point of novelty of hyper-call is in allowing normal operation of the mobile device.

The method of the invention may be applied to all transmission devices, such as radio frequency and Bluetooth devices, and is not limited to cellular phones.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in the drawings.

All the above and other characteristics and advantages of the invention will be further understood through the following illustrative and non-limitative description of preferred embodiments thereof.

DETAILED DESCRIPTION OF PREFERRED EMBODIMENTS

The principles and operation of the present invention may be better understood with reference to the drawings and the accompanying description. These are given for illustrative purposes only and are not meant to be limiting.

The present invention provides a method for locating a particular wireless device, which acts to induce the device to transmit radio signals that are unnoticeable and not displayed to the user (functionally or operatively). One point of novelty of the method lies in the fact that it does not interrupt normal operation of the device, thus leaving the wireless device user unaware.

Silent-call is a procedure where a mobile device is paged (contacted) by a mobile network in order to establish communication with it. When communication is established, the radio of the mobile transmits is induced to continuously transmit until communication is stopped by the network. It's important to note that there is a mechanism (timer) on a cell phone that sends the phone into idle if messages are not being sent after a certain period of time. The silent-call procedure of the invention keeps resetting this timer by continuously sending messages to the mobile device which require a reply. Also, if the bearer of the mobile device goes behind an obstacle, such as a wall, the signal it emits might not be powerful enough to be received by the virtual BTS. However, as soon as the device moves from behind the obstacle, the silent call will be restarted and the signal will again be received.

It is important to notice that silent-call in and of itself blocks the mobile from performing any other operations (phone calls, SMS etc) for as long as the silent-call is in progress. When the mobile device is contacted (also called "paged") by the virtual cellular network, priority is to given to this page (even though no reason is given as to why was that contact made). Thus silent-call only implements two of the three requirements—it allows covert location of the mobile device.

Figure 1:
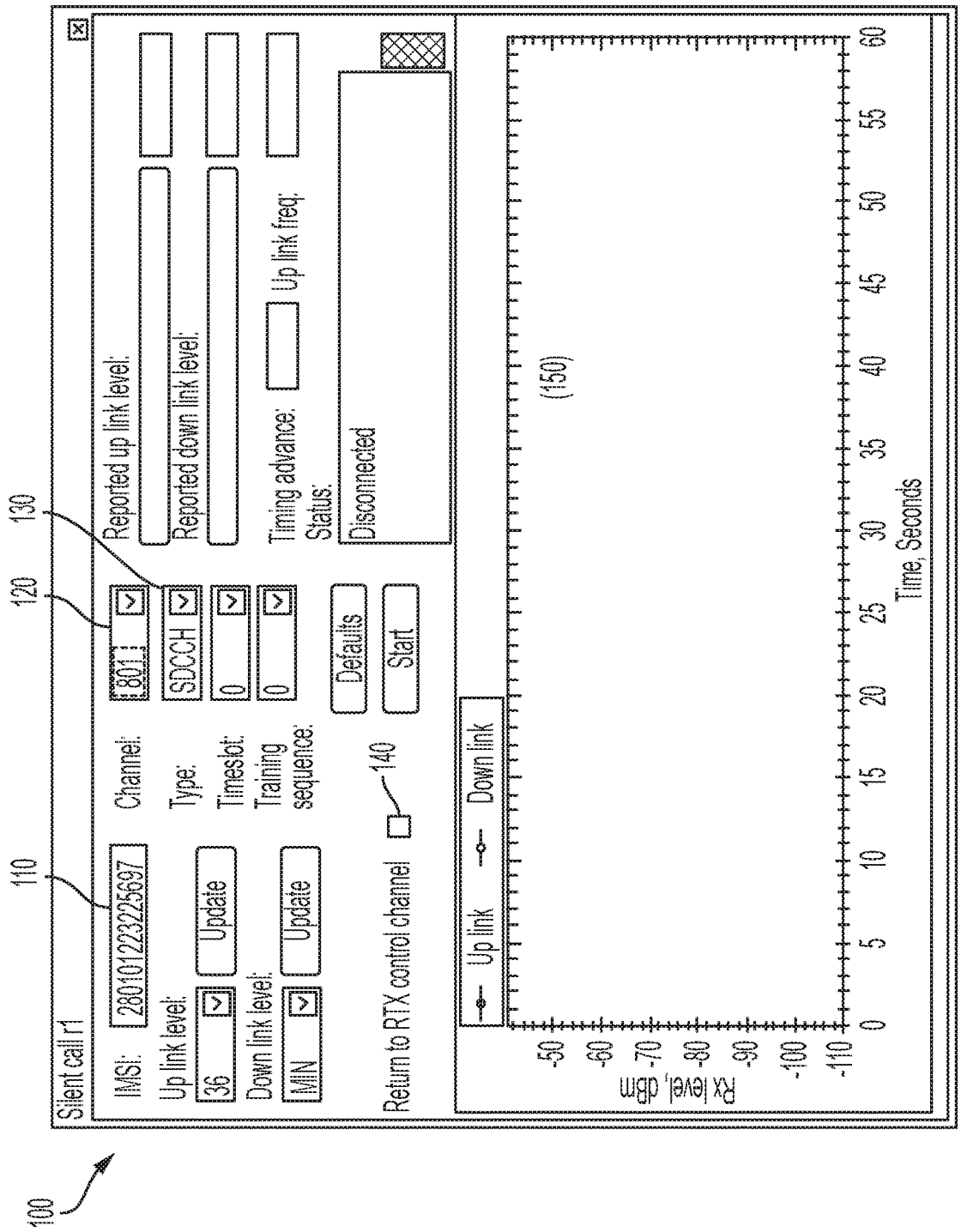
FIG. 1 shows a screen shot of the silent call mode of the method.

FIG. 1 shows a screen shot of the initial menu screen 100 of the invention, when a silent call is initiated, in order to locate a particular mobile phone. The International Mobile Subscriber Identity (IMSI) 110 of the particular phone is shown. The channel designation (120), having a value of 801 in this instance, is shown and the type of channel is a Stand Alone Dedicated Control Channel (SDCCH) 130. The operator can decide to return to the radio transceiver (RTX) control channel at the end of the silent-call operation 140.

In the lower portion (150) of the figure, the transceiver (Rx) level, expressed as dBm, is graphed in relation to the time. The term "dBm" is the ratio in decibels of the power, relative to one milliwatt.

Using this screen, the operator can choose the parameters of the silent call, can start and stop the operation, and can receive feedback of an ongoing operation in the form of a graph showing the received signal power. It is to be noted that the screenshot and GUI are merely a typical implementation, and for instance the user interface may optionally be replaced with a single "Start"/"Stop" button.

Figure 3:
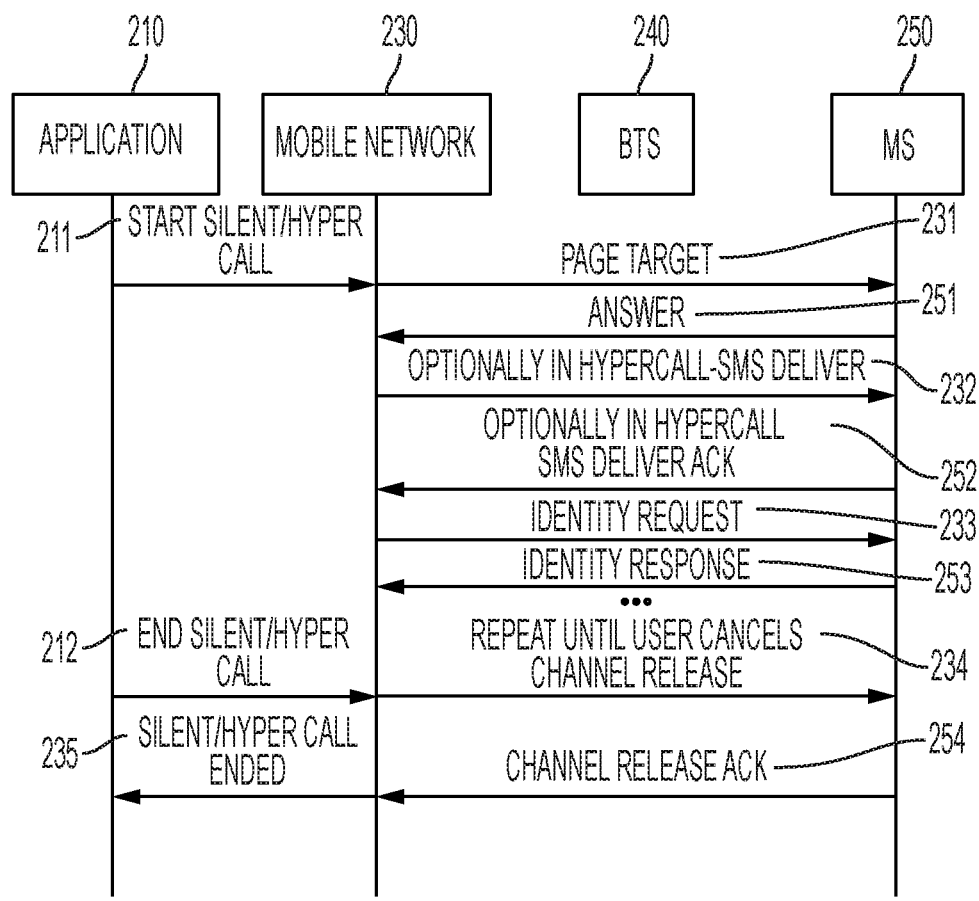
FIG. 3 is a high-level design, showing the flow between various hardware and software components of the invention.

FIG. 3 shows flow of information during both Silent Call mode of the Invention, and Hypercall Mode.

The software application 210 of the invention bypasses the mobile network 230, and acts to identify and locate a particular mobile subscriber MS (250).

During silent-call the mobile device receives multiple messages over and over in a loop, from a virtual base transceiver station (BTS) 240 (IMSI catcher).

In certain embodiments, the virtual base transceiver station is selected from: a radio frequency (RF) monitoring device; a wireless receiver; or a second wireless device (such as a second mobile phone).

In Block 211, either Silent Call Mode or Hypercall Mode are initiated. The target device is paged 231, and answers 251.

The transmission can be as simple as repeatedly sending a message to the cell phone asking for its identity 233 (e.g. its International Mobile Equipment Identity (IMEI)). The cell phone responds with an Identity Response 253. This is repeated until the operator of the invention releases the channel 234.

The message exchange does not appear on the screen of the mobile device.

If the user places an outgoing call, for example, the mobile device puts the attempted phone call on indefinite hold, for as long as the silent-call is going on.

In contrast, when Hyper-call mode of the invention is utilized, the mobile receives a text message (SMS, block 232) from the mobile network, effectively giving the device the reason why it was paged. An SMS delivery acknowledgement 252 is returned.

The wireless device (mobile phone) is located by homing in on the signal it emits while the loop is performed. Non-limiting examples of equipment for locating the wireless device include an RF receiver, and other, more sophisticated related receivers. Such an RF receiver can be tuned in to the RF frequency of the phone and aid in locating it while determining to the holder in which direction the signal becomes stronger and in which directions weaker.

Since a phone call can be performed alongside an SMS, if and when the user of the mobile device performs any operation (e.g. call), the mobile device will perform it normally. Even when an outgoing call is underway the system of the invention is able to locate the mobile from the phone call transmission. When the outgoing call is finished the network goes back to monitoring the silent-call.

Phone Call/SMS During Silent-Call

By adding the SMS messages to the silent-call implementation, one has the option to use silent-call without blocking the target device, thus having the possibility of having incoming operations (phone calls, SMS, USSD etc) and outgoing operations during the silent call.
SMS:
Sending another SMS from and to the device will not interrupt the silent-call.
Phone Calls:
FIG. 3 Phone calls are more complex to handle because one needs to transfer the phone to a traffic channel in order to connect the phone call. For Traffic Channel (TCH) silent calls this should be no problem, since the phone is already on such a channel when the request for the call is made and the only thing left to do is change the mode of the channel to enable voice.

For Stand-alone Dedicated Control Channel (SDCCH) silent calls, phone calls require switching to a traffic channel. This is accomplished by sending the proper Assignment Commands while the hyper-call is looping 233, 253. An SDCCH is a communications channel between the mobile station (MS) and the Base Transceiver Station (BTS), used for signaling during call set-up before a TCH is allocated.

The operator must define in advance whether to block phone calls or to allow them on the traffic channel. Since a phone call is a real time operation this choice has to be decided beforehand. Therefore a general option "Phone calls/SMSs allowed" to enable/disable phone calls, is included in the silent call graphic user interface (GUI).

FIG. 3 Enabling and disabling encryption on the channel can also be managed during the course of the hyper-call, as the relevant messages don't interfere with the flow of communication. While the hyper-call is looping 233, 253 an Encryption Command can be sent with the preferred ciphering algorithm and the correct Kc to enable it on the channel. This way, calls and any other operation (SMS, USSD etc) can be secured.

Figure 2:
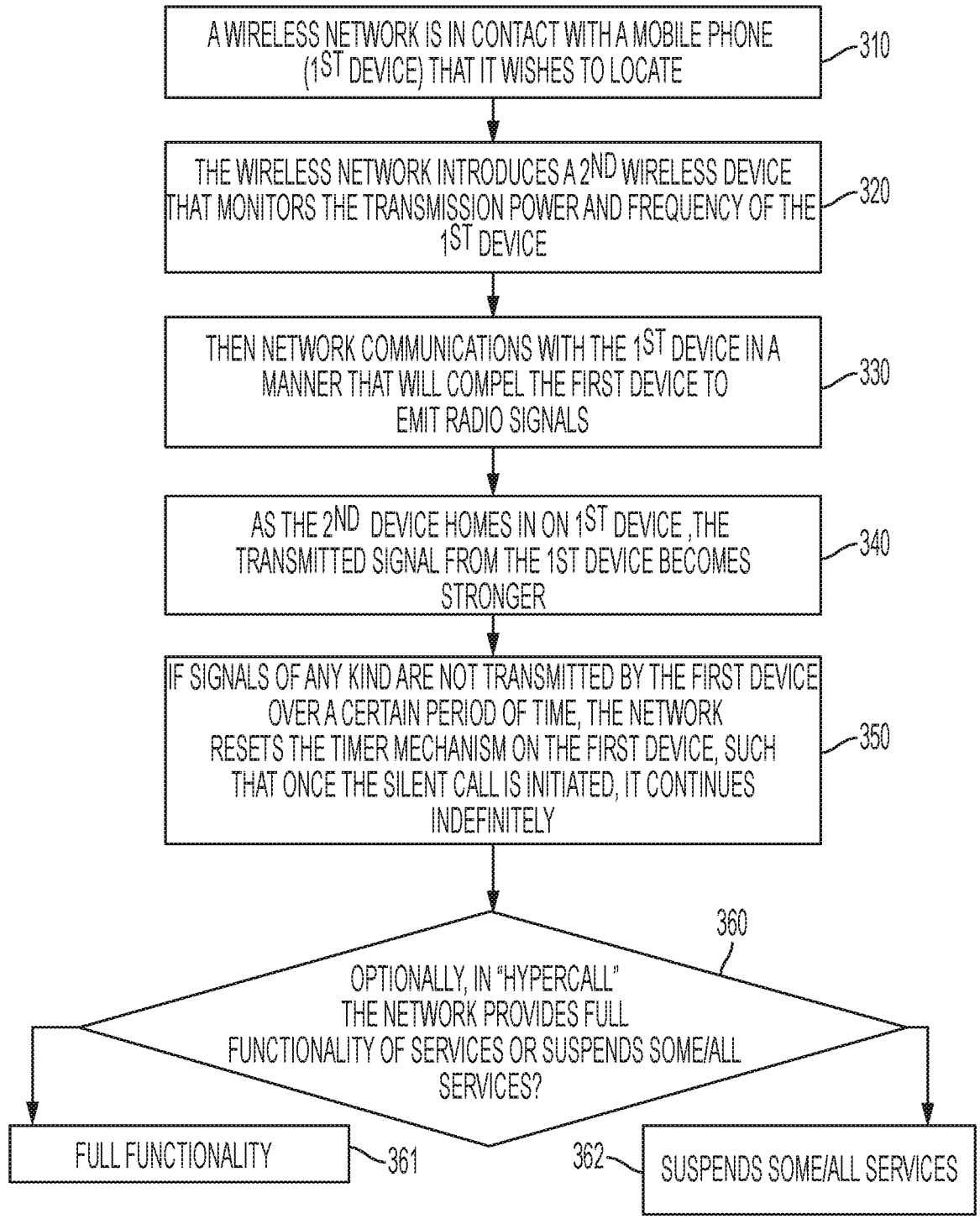
FIG. 2 is a flow chart of the central process steps for locating a wireless device.

FIG. 2 is a flow chart of one embodiment of the method of the invention, for locating a wireless device. A wireless network is in contact with a first wireless device that it wishes to locate and remain in communication with continuously 310. The wireless network introduces a second wireless device that monitors the transmission power and frequency of the first device 320. The network communicates with the first wireless device in a manner that will compel the first wireless device to emit radio signals 330.

As the second device homes in on the first device, the transmitted signal from the first device becomes stronger 340 and if signals of any kind are not transmitted by the first device over a certain period of time, the network resets the timer device, such that once the silent call is initiated, the silent call continues indefinitely 350. In the Hypercall mode, the network has option to decide 360 whether to provide full functionality of services 361 or suspend some/all services 362.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A method for locating a mobile phone communicating on a mobile network, the method comprising:
   identifying the mobile phone on the mobile network using a virtual base transceiver station (BTS) communicating over the mobile network;
   identifying a channel on which the virtual base transceiver station communicates with the mobile phone;
   using the virtual base transceiver station to communicate with said mobile phone in a silent transmission loop to compel said mobile phone to continuously emit signals;
   activating a monitoring apparatus to monitor said signals emitted from said mobile phone;
   resetting an idling timer means of said mobile phone, such that said silent transmission loop is not ended by said mobile phone;
   monitoring signal strengths corresponding to the signals emitted from said mobile phone using the monitoring apparatus; and
   identifying, using the monitoring apparatus, a relative location of the mobile phone based on the monitored signal strengths;
   releasing the channel of communication from the virtual base transceiver station.

2. The method according to claim 1, wherein said step of identifying a relative location of the mobile phone, is performed using one of the following: a radio frequency monitoring device: a wireless receiver; and a second mobile phone.

3. The method according to claim 1, wherein said monitoring apparatus monitors the transmission power and/or said frequency of said mobile phone.

4. The method according to claim 1, wherein said signals emitted by the mobile phone are radio signals.

5. The method according to claim 1, wherein said step of identifying a relative location comprises one or more of: identifying a relative direction of said mobile phone from said monitoring apparatus; and identifying a relative distance of said mobile phone from said monitoring apparatus.

6. The method of claim 1, wherein a display of said mobile phone remains unaffected during operation of said method.

7. The method of claim 1, wherein said functionality of said mobile phone remains unaffected during operation of said method.

8. The method of claim 1, further comprising allowing selection of services provided to said mobile phone during operation of said method; said services comprising one or more of: data packet handling, incoming call, outgoing call, incoming SMS and outgoing SMS.

* * * * *